(12) United States Patent
Hannig

(10) Patent No.: US 9,512,622 B2
(45) Date of Patent: Dec. 6, 2016

(54) DECORATIVE PANEL HAVING AN ELASTOMER POWDER-MODIFIED SUBSTRATE BOARD

(71) Applicant: AKZENTA PANEELE + PROFILE GMBH, Kaisersesch (DE)

(72) Inventor: Hans-Jürgen Hannig, Bergisch Gladbach (DE)

(73) Assignee: AKZENTA PANEELE + PROFILE GMBH, Kaisersesch (DE)

( * ) Notice: Subject to any disclaimer, the term of this patent is extended or adjusted under 35 U.S.C. 154(b) by 0 days.

(21) Appl. No.: 14/759,871

(22) PCT Filed: Dec. 2, 2013

(86) PCT No.: PCT/EP2013/075233
§ 371 (c)(1),
(2) Date: Jul. 8, 2015

(87) PCT Pub. No.: WO2014/111192
PCT Pub. Date: Jul. 24, 2014

(65) Prior Publication Data
US 2015/0368909 A1 Dec. 24, 2015

(30) Foreign Application Priority Data
Jan. 18, 2013 (EP) ..................... 13151841

(51) Int. Cl.
| *B32B 3/00* | (2006.01) |
| *E04F 13/18* | (2006.01) |
| *C08L 7/00* | (2006.01) |
| *C08L 9/00* | (2006.01) |
| *C08L 9/06* | (2006.01) |
| *C08L 21/00* | (2006.01) |
| *B32B 3/06* | (2006.01) |
| *B32B 27/10* | (2006.01) |
| *E04F 13/08* | (2006.01) |
| *E04F 15/10* | (2006.01) |

(52) U.S. Cl.
CPC ............ *E04F 13/185* (2013.01); *B32B 3/06* (2013.01); *B32B 27/10* (2013.01); *C08L 7/00* (2013.01); *C08L 9/00* (2013.01); *C08L 9/06* (2013.01); *C08L 21/00* (2013.01); *E04F 13/0873* (2013.01); *E04F 13/0889* (2013.01); *E04F 15/105* (2013.01); *B32B 2255/10* (2013.01); *B32B 2255/12* (2013.01); *B32B 2264/0221* (2013.01); *B32B 2419/00* (2013.01); *B32B 2451/00* (2013.01); *B32B 2607/00* (2013.01); *Y10T 428/24777* (2015.01); *Y10T 428/24934* (2015.01); *Y10T 428/31841* (2015.04); *Y10T 428/31899* (2015.04)

(58) Field of Classification Search
CPC .. E04F 13/185; E04F 13/0873; E04F 13/0889; E04F 15/105; B32B 3/06; B32B 27/10; C08L 7/00; C08L 9/00; C08L 9/06; C08L 21/00; Y10T 428/24777; Y10T 428/24934; Y10T 428/31841; Y10T 428/31899
See application file for complete search history.

(56) References Cited

U.S. PATENT DOCUMENTS

| 5,366,779 A | 11/1994 | Thompson |
| 5,776,511 A | 7/1998 | Miki et al. |
| 6,767,623 B1 | 7/2004 | Mock et al. |
| 2005/0065236 A1* | 3/2005 | Stroppiana ............ C08L 23/04 523/171 |
| 2011/0305886 A1 | 12/2011 | Phan et al. |
| 2012/0276348 A1 | 11/2012 | Clausi et al. |

FOREIGN PATENT DOCUMENTS

EP 2345695 A1 7/2011

OTHER PUBLICATIONS

International Search Report, PCT/EP2013/075233, dated Mar. 25, 2014, 3 pages.
International Preliminary Report on Patentability, PCT/EP2013/075233, dated Jul. 21, 2015, 7 pages.
Written Opinion, PCT/EP2013/075233, dated Mar. 25, 2014, 5 pages.

* cited by examiner

*Primary Examiner* — Elizabeth Mulvaney
(74) *Attorney, Agent, or Firm* — Senniger Powers LLP

(57) ABSTRACT

A decorative panel comprising at least a plate-shaped carrier and a decorative layer disposed thereon and which is characterized in that the plate-shaped carrier comprises at least partially a thermoplastic composition modified with an elastomer powder by means of melt blending, wherein the thermoplastic composition includes at least one thermoplastic matrix material and at least one fine-grained, cross-linked and powdery elastomer material incorporated into the matrix material. A method for producing the foregoing decorative panel comprising applying a decorative layer to the plate-shaped carrier.

16 Claims, No Drawings

DECORATIVE PANEL HAVING AN ELASTOMER POWDER-MODIFIED SUBSTRATE BOARD

REFERENCE TO RELATED APPLICATIONS

This application is a U.S. national stage application of International Patent Application No. PCT/EP2013/075233, filed Dec. 2, 2013, and claims the benefit of priority of European Application No. 13151841.7, filed Jan. 18, 2013, the entire disclosures of which are incorporated herein by reference.

FIELD OF THE INVENTION

The present invention relates to a decorative panel comprising a plate-shaped carrier which is at least partially made of a thermoplastic composition modified with an elastomer powder. Moreover, the present invention relates to a method for producing a corresponding decorative panel.

BACKGROUND OF THE INVENTION

The term decorative panel in the sense of the invention means wall, ceiling or floor panels comprising a decoration applied onto a carrier plate. Decorative panels are used in a variety of ways both in the field of interior design of rooms and for decorative cladding of buildings, for example in exhibition stand construction. One of the most common application fields of decorative panels is their use as a floor covering. Herein, the decorative panels often comprise a decoration intended to replicate a natural material.

Examples of such replicated natural materials are wood species such as maple, oak, birch, cherry, ash, walnut, chestnut, wenge or even exotic woods such as Panga Panga, mahogany, bamboo and bubinga. In addition, often natural materials such as stone surfaces or ceramic surfaces are replicated.

Heretofore, such decorative panels have often been produced as laminates in which a decorative paper preprinted with a desired decoration is applied onto a carrier plate and, in turn, a so-called overlay is applied onto the decorative paper. After optionally a backing paper has been applied to the side of the carrier plate opposite to the decorative paper, the laminate structure obtained is fixedly bonded together by use of appropriate pressure and/or heat-activated adhesives.

Dependent on the desired area of application of the decorative panels they can be made of different materials. In particular, the material of the carrier can be chosen depending on the area of application. Thus, the carrier may for example consist of a wood-based material, provided that the decorative panels are not exposed to excessive moisture or weather conditions. If the panel on the other hand is to be used for example in wet rooms or outdoors the carrier may for example consist of a plastic material.

Examples of plastic materials which may be used for the production of corresponding panels are thermoplastic materials such as polyvinyl chloride, polyolefines (such as polyethylene (PE), polypropylene (PP)), polyamides (PA), polyurethanes (PU), polystyrene (PS), acrylonitril butadiene styrene (ABS), polymethyl methacrylate (PMMA), polycarbonate (PC), polyethylene terephthalate (PET), polyether ether ketone (PEEK) or mixtures or co-polymerizates thereof. The plastic materials can include common fillers, such as calcium carbonate (chalk), aluminum oxide, silicagel, quartz powder, wood flour, gypsum. In addition they can be coloured in a known way.

For applying a decoration onto the carrier plate or a plate-shaped carrier it is known to apply a decorative paper printed with a corresponding decoration onto the plate-shaped carrier, for example by means of a resin layer previously applied onto the plate-shaped carrier as a bonding agent. Moreover, it is known to provide decorative panels with a decoration by means of a so-called direct printing process.

The term "direct printing" in the sense of the invention means the application of a decoration directly onto the carrier of a panel or onto an unprinted fiber material layer applied to the carrier. In contrast to the conventional methods in which a decorative layer previously printed with a desired decoration is applied onto the carrier, in direct printing the decoration is printed directly in the course of the panel manufacturing process. Here, different printing techniques such as flexographic printing, offset printing or screen printing may be used. In particular digital printing techniques such as inkjet processes or laser printing can be used.

In the sense of the invention the term fiber materials means materials such as paper and non-woven fabrics on the basis of plant, animal, mineral or even synthetic fibers as well as cardboards. Examples are fiber materials on the basis of plant fibers and, in addition to papers and non-woven fabrics made of cellulose fibers, boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool.

For protecting the applied decoration layer normally wearing or top layers are applied on top of the decorative layer. A wearing and/or top layer in the sense of the invention is a layer applied as an outer border which in particular protects the decorative layer from wear or damage caused by dirt, moisture or mechanical impacts, such as abrasion.

It is often provided that in such wearing or top layers a surface structure matching with the decoration is produced. A surface structure matching with the decoration means that the surface of the decorative panel has a haptically perceivable structure which with respect to its shape and pattern corresponds to the applied decoration in order to achieve a reproduction of a natural material as close to the original as possible even with respect to the haptic.

In order to extend the areas of application of said decorative panels in particular in wet rooms or outdoors in addition to carriers on the basis of wood-based materials as a material of the plate-shaped carrier also plastic materials are recently increasingly used as a material for such carriers. Such panels are known, for example, from the international patent application WO 2010/023042 A1. A disadvantage of these plate-shaped carriers is that the plastic materials used for the production of the plate-shaped carriers on the one hand are mainly derived from mineral oils, the limited resources of which contributes significantly to the costs, and on the other hand such mineral oil based products are often assessed as critical. Moreover, plastic materials hitherto used for the plate-shaped carriers, such as in particular polyvinyl chloride (PVC) are increasingly getting into the focus of public criticism, since they may involve a relevant problem potential from an ecological perspective. Thus, for example, for the production of soft PVC plasticizers, e.g. from the group of phthalates, have to be added in an amount of 20-30 wt.-% in order to ensure the desired elasticity of the PVC material. Such additives, however, are considered as critical in the course of recent legal regulations and this is the reason why it is tried to avoid the use of such substances.

SUMMARY OF THE INVENTION

Taking this into account it is an object of the present invention to provide a decorative panel on the basis of a plastic carrier which is able to overcome the problems known from the prior art. Moreover, it is an object of the present invention to provide a method for producing a corresponding decorative panel.

This object is achieved by a decorative panel according to claim 1 and a method according to claim 11. Embodiments of the invention are disclosed in the dependent claims and in the following description.

Briefly, therefore, in one aspect the invention is directed to a decorative panel comprising at least a plate-shaped carrier and a decorative layer disposed thereon and which is characterized in that the plate-shaped carrier is produced at least partially from a thermoplastic composition modified with an elastomer powder by means of melt blending, wherein the thermoplastic composition includes at least one thermoplastic matrix material and at least one fine-grained, cross-linked and powdery elastomer material incorporated into the matrix material.

In another aspect, the invention is directed to a method for producing a decorative panel comprising the steps of applying a decorative layer onto a plate-shaped carrier, wherein the plate-shaped carrier is at least partially made of thermoplastic composition modified with an elastomer powder, wherein the thermoplastic composition comprises at least one thermoplastic matrix material and at least one fine-grained, cross-linked and powdery elastomer material incorporated into the matrix material.

Surprisingly, it has been found that a thermoplastic composition modified with an elastomer powder comprising at least one thermoplastic matrix material and at least one fine-grained, cross-linked and powdery elastomer material incorporated into the matrix material is excellently suitable as a material for the production of plate-shaped carriers for decorative panels. Such an elastomer material is known, for example, from the European patent EP 2345695 B1.

DETAILED DESCRIPTION OF PREFERRED EMBODIMENTS

According to a preferred embodiment of the invention the matrix material has a Shore hardness [X] according to DIN 53505 and the elastomer material has a Shore hardness [Y] according to DIN 53505, wherein the relation between [X] and [Y] is given by $[Y]=[X]\pm[Z]$, $[Z]\leq30$, and the elastomer material has a Shore hardness [Y] according to DIN 53505 between $\geq50$ and $\leq70$. Such a material exhibits excellent properties for decorative panels with respect to sound insulation and moisture resistance.

Preferably, the thus produced material for the use as a plate-shaped carrier in a decorative panel has a hardness between Shore-A 60 to Shore-D 60, preferably a hardness of Shore-D 30 to Shore-D 50.

According to a preferred embodiment of the invention the matrix material has a hardness, measured as Shore-D, in a range between $\geq40$ D and $\leq90$ D. According to a further embodiment of the invention the proportion of the elastomer material in the thermoplastic composition is preferably between $\geq20$ and $\leq85$ wt.-%, more preferably between $\geq50$ and $\leq75$ wt.-%.

According to a further embodiment of the invention the elastomer material is at least one material which is selected from the group consisting of olefin diene rubbers, styrene butadiene rubbers and natural rubbers. It is particularly preferred that the elastomer material consists at least partially of recycled plastics, such as production residues of technical elastomer products, peeled treads of truck tires, styrene-butadiene rubber powders from production residues and the like.

Preferably, the powdery elastomer material has a mean grain size of $\geq100$ μm and $\leq600$ μm, preferably between $\geq100$ μm and $\leq400$ μm.

According to a further embodiment of the invention the thermoplastic matrix material is a polyolefin and/or an olefin copolymer, preferably at least one material which is selected from the group consisting of polypropylene, polyethylene and ethylene propylene diene rubber (EPDM).

Preferably, the proportion of the thermoplastic matrix material within the thermoplastic composition is in a range between $\geq15$ wt.-% and $\leq80$ wt.-%. Herein, the thermoplastic matrix material can in particular consist of a mixture of different thermoplastic materials. It may for example be provided that the thermoplastic matrix material included within the thermoplastic composition comprises a main thermoplastic material and an additional thermoplastic material. The proportion of the main thermoplastic material can for example be in a range between $\geq5$ wt.-% and $\leq70$ wt.-% with respect to the entire thermoplastic composition. The additional thermoplastic material in the composition according to the invention can be included in a concentration range between for example $\geq0$ wt.-% and $\leq50$ wt.-%, preferably $\leq30$ wt.-%. Examples of suitable main thermoplastic materials are thermoplastic olefins based on isotactic polypropylene and ethylene propylene diene rubber (PP/EPDM). Suitable additional thermoplastic materials are for example polyolefin, such as polypropylenes.

According to another embodiment of the invention the decorative layer is formed from a printed or unprinted decorative paper/decorative film applied onto the plate-shaped carrier or from an ink layer applied directly onto the plate-shaped carrier by means of a direct printing process or applied onto a printing substrate previously applied onto the plate-shaped carrier. Herein, it is particularly preferred that the decorative layer is applied by a direct printing process. Both in direct printing onto the plate-shaped support and in direct printing onto a nonwoven fabric, film or paper layer (decorative paper layer/decorative film layer) previously applied onto the plate-shaped carrier it can be provided that prior to the application of the ink a printing substrate is applied. In particular in the case that the printing substrate is applied directly onto the plate-shaped carrier without an intermediate nonwoven fabric, film or paper layer it will be provided that as a printing substrate a composition is applied, which on the one hand comprises radically curing components and on the other hand comprises polyurethane components, as is known, for example, from dual-cure coating systems. It may in particular be provided that the printing substrate comprises urethane acrylates. In addition, the printing substrate can in particular include pigments, such as titanium dioxide.

According to a further embodiment of a decorative panel according to the invention the decorative panel can comprise a transparent or translucent top and/or wearing layer applied onto the decorative layer.

The wearing or top layer applied for protecting the decorative layer can be applied in a subsequent process step, wherein it can in particular be provided that the decorative plate already provided with the decorative layer is stored temporarily as a semi-finished product prior to the application of the wearing and/or top layer. The wearing and/or top layer may, for example, include hard materials such as titanium nitride, titanium carbide, silicon nitride, silicon carbide, boron carbide, tungsten carbide, tantalum carbide, alumina (corundum), zirconia or mixtures thereof in order to increase the wear resistance of the layer. It may be provided that the hard material is included in an amount between 5 wt.-% and 40 wt.-%, preferably between 15 wt.-% and 25 wt.-% in the wearing and/or top layer composition. Preferably, the hard material has a mean grain diameter between 10 µm and 250 µm, more preferably between 10 µm and 100 µm. In this way in an advantageous manner it is achieved that the wearing and/or top layer composition forms a stable dispersion and a decomposition or a precipitation of the hard material in the wearing and/or top layer composition can be avoided. In order to form a corresponding wearing and/or top layer in one embodiment of the invention it is provided that the hard material containing, preferably radiation curable composition is applied in a concentration between 10 $g/m^2$ and 250 $g/m^2$, preferably between 25 $g/m^2$ and 100 $g/m^2$. In this case, the application can be implemented, for example, by means of rollers such as rubber rollers or by means of pouring devices. In a further embodiment of the invention it can be provided that the hard material is not included in the composition at the time of application of the wearing and/or top layer composition but is scattered in the form of particles onto the applied wearing layer composition and subsequently the wearing layer is cured.

Moreover it can be provided that a surface structure matching with the decoration is produced in the wearing and/or top layer. It can be provided that the carrier plate already has a structure and an alignment of a printing tool for the application of the decoration and the carrier plate relative to each other is implemented depending on the structure of the carrier plate detected by means of optical methods. For aligning the printing tool and the carrier plate relative to each other it can be provided that a relative movement between the printing tool and the carrier plate necessary for the alignment is implemented by shifting the carrier plate or by shifting the printing tool. According to a further embodiment of the invention it is provided that a structuring process of the decorative panels is implemented subsequently to the application of the top and/or wearing layer. To this end it may be preferred to apply a curable composition as the top and/or wearing layer and a curing process is implemented only to the extent that only a partial curing of the top and/or wearing layer is achieved. In the thus partially cured layer by means of appropriate tools, such as a hard metal texture roller or a die, a desired surface structure is embossed. Herein, the embossing process is implemented in correspondence with the applied decoration. In order to ensure a sufficient correspondence of the structure to be produced with the decoration it may be provided that the carrier plate and the embossing tool are aligned relative to each other by corresponding relative movements. Subsequently to the production of the desired structure within the partially cured top and/or wearing layer a further curing step is implemented with respect to the now structured top and/or wearing layer.

In a further embodiment of the method according to the invention it can be provided that the structure is produced in the course of the printing process. To this end, it may be provided, for example, that a multiple ink application is implemented in such a way that raised areas arise on the printing substrate which result in a desired three-dimensional structure. Then, onto the structure thus produced a wearing and/or top layer can be applied.

According to another embodiment of the invention it can be provided that the decorative panel comprises a profile at least in an edge region of the plate-shaped carrier. Here, it may in particular be provided that the decoration is applied also in the region of the profile, such that the profiling process is implemented prior to the application of the decorative layer onto the plate-shaped carrier. Alternatively or in addition a profiling process can be implemented subsequently to the application of the decorative layer. In profiling in the sense of the invention it is provided that by means of suitable machining tools at least in a portion of the edges of the decorative panel a decorative and/or functional profile is produced. Here, a functional profile, for example, means the production of a groove and/or tongue profile in an edge in order to make decorative panels connectable to each other by means of the produced profiles. A decorative profile in the sense of the invention, for example, is a chamfer formed at the edge region of the decorative panel, for example, in order to simulate a joint between two interconnected panels, such as for example in so-called wide planks.

By partially profiling the decorative panel not all profiles to be provided in the finished panel are produced, but only part of the profiles, while other profiles are produced in a subsequent step. Thus, it may be provided, for example, that the decorative profile to be provided in a panel, such as a chamfer, is produced in one step, while the functional profile, e.g. groove/tongue, is produced in a subsequent step.

By applying the decoration subsequently to the at least partially profiling of the carrier, for example, by means of the above-described methods, such as direct printing, abrasion or damage of the decoration in the course of the profiling process can be avoided in an advantageous way. Thus, the decoration also in the regions of the profile corresponds in detail to the desired imitation, for example, of a natural material.

According to a further embodiment of the invention it can be provided that the profiling is not produced by machining within the plate-shaped carriers, but at least a part of the profile to be provided is already produced during the manufacture of the plate-shaped carrier. This, for example, can be done by use of appropriate forming methods such as injection molding or extrusion processes.

According to a preferred embodiment of the invention the profile is at least partially configured such that several decorative panels can be releasably connected to each other by means of corresponding profiles.

According to a further embodiment of the invention it may be provided that the decorative panel comprises a backing layer on the side of the plate-shaped carrier opposite of the decorative layer. In particular by means of the plate-shaped carriers used according to the invention on the basis of the thermoplastic composition described above, which may have a high elasticity, the backing layer can serve for avoiding deformations of the plate-shaped carrier caused by the applied decorative, top and/or wearing layer. It may in particular be provided that the backing layer is formed of a film, nonwoven fabric and/or paper layer applied on the side opposite to the decorative layer. In a particularly preferred embodiment of the invention it can be provided that the backing layer is applied in a common process step with the application of an unprinted decorative paper layer onto the decorative side of the plate-shaped carrier and/or in a common process step with the application of a printing substrate onto the decorative side of the plate-shaped carrier. It is particularly preferred that as a backing layer a film layer is applied and thus in particular a moisture and/or water-resistant backing layer is formed.

The decorative panels according to the invention provide economic and environmental benefits, and they are in particular characterized by the following properties:
- water-resistant carrier plate having a layer thickness of 3-18 mm;
- high elasticity which can be adjusted target-oriented to the intended use by varying the proportions of the thermoplastic polymer matrix and the rubber elastic recycling components incorporated therein;
- the carrier plate can be provided with click profiles and locking elements by means of milling, wherein due to the elasticity of the plate material it can be dispensed with spring elements made of another material;
- the carrier plate can be primed, printed and provided with an abrasion-resistant wearing layer subsequently to a surface activation;
- by selecting a suitable thermoplastic component a high temperature resistance over 100° C. can be achieved;
- the plate material can be disposed without any problems, because the plate is chlorine-free and no dioxins or similar hazardous substances are produced during combustion;
- the plate does not include any plasticizers and attains its high elasticity from the incorporated elastomer particles;
- the plate represents an ecologically sophisticated replacement material for PVC;
- through the use of recycled materials which are significantly lower in price than thermoplastic materials, the production costs for a plastic plate can be significantly reduced.

Usable recycled materials from the rubber and tire industry are accumulated worldwide in large quantities and can therefore be provided inexpensively.

Moreover, the present invention relates to a method for producing a decorative panel comprising the step of:
a) providing a plate-shaped carrier; and
b) applying a decorative layer onto the plate-shaped carrier, wherein as a plate-shaped carrier a carrier is provided which is at least partially made of a thermoplastic composition modified with an elastomer powder, wherein the thermoplastic composition comprises at least one thermoplastic matrix material and at least one fine-grained, cross-linked and powdery elastomer material incorporated into the matrix material.

According to another embodiment of the method according to the invention it can be provided that the decorative layer is applied by means of a direct printing process. It may in particular be provided that the decorative layer is applied by means of a digital printing process by use of a radiation curable ink.

Furthermore, it can be provided that prior to the application of the decorative layer a printing substrate is applied onto the plate-shaped carrier. It may in particular be provided that as a printing substrate a composition is applied comprising on the one hand radically curing components and on the other hand polyurethane components, as is known, for example, from dual-cure coating systems. It may in particular be provided that the printing substrate includes urethane acrylates. In addition, the printing substrate may in particular include pigments, such as titanium dioxide.

In a further preferred embodiment of the method according to the invention a backing layer is applied on the side of the plate-shaped carrier opposite to the decorative layer. Here, it can be provided that the backing layer is applied in a common process step with the application of an unprinted decorative paper/decorative film layer onto the decorative side of the plate-shaped carrier and/or in a common process step with the application of a printing substrate onto the decorative side of the plate-shaped carrier.

In a further preferred embodiment of the method according to the invention a transparent or translucent top and/or wearing layer is applied onto the decorative layer. Herein, it may in particular be provided that as the top and/or wearing layer a radiation curable composition is applied.

The invention claimed is:

1. Decorative panel, at least comprising a plate-shaped carrier and a decorative layer disposed thereon, characterized in that the plate-shaped carrier comprises a thermoplastic composition modified with an elastomer powder by means of melt blending, wherein the thermoplastic material comprises at least one thermoplastic matrix material and at least one fine-grained, cross-linked and powdery elastomer material incorporated in the matrix material;
wherein the thermoplastic matrix material is a polyolefin and/or an olefin copolymer; and
the decorative layer comprises a printed or unprinted decorative paper on the plate-shaped carrier; or the decorative layer comprises an ink layer directly on the plate-shaped carrier or on a printing substrate directly printed on the plate-shaped carrier.

2. Decorative panel according to claim 1, wherein the matrix material has a Shore hardness [X] according to DIN 53505 and the elastomer material has a Shore hardness [Y] according to DIN 53505, wherein the relation between [X] and [Y] is given by [Y]=[X]±[Z], [Z]≤30 and the elastomer material has a Shore hardness [Y] according to DIN 53505 between ≥50 and ≤70.

3. Decorative panel according to claim 1, wherein the proportion of the elastomer material in the thermoplastic composition is between ≥20 and ≤85 wt.-%.

4. Decorative panel according to claim 1, wherein the elastomer material is at least one material selected from the group consisting of olefin diene rubbers, styrene butadiene rubbers and natural rubbers.

5. Decorative panel according to claim 1 wherein the decorative layer comprises a printed or unprinted decorative paper on the plate-shaped carrier; or the decorative layer comprises an ink layer directly on the plate-shaped carrier or directly on a printing substrate printed directly on the plate-shaped carrier.

6. Decorative panel according to claim 1,
wherein the panel comprises a transparent or translucent top and/or wearing layer applied onto the decorative layer.

7. A decorative panel comprising a plate-shaped carrier and a decorative layer disposed thereon, characterized in that the plate-shaped carrier comprises a thermoplastic composition modified with an elastomer powder by means of melt blending;
wherein the thermoplastic material comprises at least one thermoplastic matrix material and at least one fine-grained, cross-linked and powdery elastomer material incorporated in the matrix material; and
wherein the panel has a profile at least in an edge region of the plate-shaped carrier.

8. Decorative panel according to claim 7, wherein the profile is configured such that a plurality of decorative panels can be releasably interconnected by means of corresponding profiles.

9. Decorative panel according to claim 1, wherein the panel comprises a backing layer on the side of the plate-shaped carrier opposite to the decorative layer.

10. Method for producing a decorative panel, comprising the step of:
   a) providing a plate-shaped carrier; and
   b) applying a decorative layer onto the plate-shaped carrier,
      wherein as the plate-shaped carrier a carrier is provided which at least partially is made of thermoplastic composition modified with an elastomer powder, wherein the thermoplastic composition comprises at least one thermoplastic matrix material and at least one fine-grained, cross-linked and powdery elastomer material incorporated into the matrix material;
      the thermoplastic matrix material is a polyolefin and/or an olefin copolymer; and
      the decorative layer comprises a printed or unprinted decorative paper on the plate-shaped carrier; or the decorative layer comprises an ink layer directly on the plate-shaped carrier or on a printing substrate directly printed on the plate-shaped carrier.

11. Method according to claim 10,
   wherein the decorative layer is applied by means of a direct printing process.

12. Method according to claim 10,
   wherein prior to the application of the decorative layer a printing substrate is applied onto the plate-shaped carrier.

13. Method according to claim 10 comprising applying a backing layer onto the side of the plate-shaped carrier opposite to the decorative layer.

14. Method according to claim 10 comprising applying a transparent or translucent top and/or wearing layer onto the decorative layer.

15. Decorative panel of claim 1, wherein:
   the panel has a profile at least in an edge region of the plate-shaped carrier which profile is configured such that a plurality of decorative panels can be releasably interconnected by means of corresponding profiles.

16. Decorative panel of claim 1, wherein:
   the panel has a profile at least in an edge region of the plate-shaped carrier which profile is configured such that a plurality of decorative panels can be releasably interconnected by means of corresponding profiles;
   the panel comprises a backing layer on the side of the plate-shaped carrier opposite to the decorative layer; and
   the panel comprises a transparent or translucent top and/or wearing layer applied onto the decorative layer.

* * * * *